US011523344B2

(12) United States Patent
Song et al.

(10) Patent No.: US 11,523,344 B2
(45) Date of Patent: *Dec. 6, 2022

(54) MOBILE DEVICE FOR POWER REDUCTION AND METHOD THEREOF

(71) Applicant: Samsung Electronics Co., Ltd., Suwon-si (KR)

(72) Inventors: Seong-Wook Song, Seoul (KR); Jin-Hee Cheon, Seoul (KR); Da-Hae Chong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1 day.

This patent is subject to a terminal disclaimer.

(21) Appl. No.: 17/113,344

(22) Filed: Dec. 7, 2020

(65) Prior Publication Data

US 2021/0092683 A1 Mar. 25, 2021

Related U.S. Application Data

(63) Continuation of application No. 16/436,128, filed on Jun. 10, 2019, now Pat. No. 10,863,440, which is a
(Continued)

(30) Foreign Application Priority Data

Apr. 5, 2013 (KR) .......................... 10-2013-0037600

(51) Int. Cl.
*H04W 52/02* (2009.01)
(52) U.S. Cl.
CPC ....... *H04W 52/0241* (2013.01); *H04W 52/02* (2013.01); *H04W 52/028* (2013.01); *H04W 52/0222* (2013.01); *Y02D 30/70* (2020.08)

(58) Field of Classification Search
CPC ......... H04W 52/0235; H04W 52/0241; H04W 52/0261; H04W 52/04; H04W 52/06;
(Continued)

(56) References Cited

U.S. PATENT DOCUMENTS 4,851,830 A 7/1989 Andros et al.
5,835,855 A 11/1998 Burns
(Continued)

FOREIGN PATENT DOCUMENTS

CN 102165755 A 8/2011
EP 2 458 922 A1 5/2012
(Continued)

OTHER PUBLICATIONS

Australian Notice of Acceptance dated Jan. 9, 2018, issued in the Australian Application No. 2014226776.
(Continued)

*Primary Examiner* — Jean A Gelin
(74) *Attorney, Agent, or Firm* — Jefferson IP Law, LLP

(57) ABSTRACT

A device and a method for saving power in a mobile electronic device are provided. A mobile electronic device includes a plurality of antennas and a transceiver, wherein the transceiver includes a control unit configured to switch to a low power mode to operate in the low power mode, or to operate at least one of the plurality of antennas in the low power mode when a data non-transmission period occurs for a predetermined time in an active state.

20 Claims, 15 Drawing Sheets

Related U.S. Application Data continuation of application No. 14/193,473, filed on Feb. 28, 2014, now Pat. No. 10,321,404.

(60) Provisional application No. 61/773,402, filed on Mar. 6, 2013.

(58) Field of Classification Search
CPC . H04W 52/18; H04W 52/38; H04W 52/0222; H04W 52/028; H04W 52/02; Y02D 70/1262; Y02D 70/00; Y02D 70/124
See application file for complete search history.

(56) References Cited

U.S. PATENT DOCUMENTS

| | | | |
|---|---|---|---|
| 6,842,478 B1 | 1/2005 | Ogino | |
| 8,036,710 B2* | 10/2011 | Walton | H04W 52/029 455/574 |
| 8,099,043 B2 | 1/2012 | Hong et al. | |
| 9,462,546 B2 | 10/2016 | Ohta et al. | |
| 9,681,414 B2 | 6/2017 | Kazmi et al. | |
| 2002/0061005 A1* | 5/2002 | Lee | H04B 7/061 370/347 |
| 2002/0132603 A1* | 9/2002 | Lindskog | H04W 72/1215 340/7.32 |
| 2003/0051183 A1 | 3/2003 | Lo et al. | |
| 2003/0128744 A1 | 7/2003 | Yeo et al. | |
| 2004/0248573 A1 | 12/2004 | Wandel | |
| 2005/0250452 A1 | 11/2005 | Walton et al. | |
| 2005/0272384 A1 | 12/2005 | Kogure | |
| 2008/0209064 A1 | 8/2008 | Hekstra-Nowacka | |
| 2009/0046787 A1* | 2/2009 | Uesugi | H04L 25/0232 375/260 |
| 2009/0080433 A1 | 3/2009 | Wertheimer | |
| 2009/0144484 A1 | 6/2009 | Sukegawa | |
| 2010/0091758 A1* | 4/2010 | Goteti | H04W 72/1268 370/345 |
| 2010/0136928 A1 | 6/2010 | Rofougaran | |
| 2011/0188496 A1 | 8/2011 | Schaade et al. | |
| 2011/0249022 A1 | 10/2011 | Poornachandran et al. | |
| 2012/0113940 A1 | 5/2012 | Cho et al. | |
| 2012/0122511 A1 | 5/2012 | Antonio et al. | |
| 2012/0218940 A1 | 8/2012 | Ke et al. | |
| 2012/0281561 A1 | 11/2012 | Shukla et al. | |
| 2012/0295576 A1* | 11/2012 | Peterson | G08G 1/205 455/404.2 |
| 2013/0005379 A1 | 1/2013 | Yamazaki | |
| 2013/0021995 A1 | 1/2013 | Ehsan et al. | |
| 2013/0034066 A1* | 2/2013 | Kakishima | H04W 16/28 370/329 |
| 2013/0143590 A1* | 6/2013 | Sridhara | G01S 5/021 455/456.1 |
| 2013/0237171 A1 | 9/2013 | Lindoff et al. | |
| 2013/0255895 A1* | 10/2013 | Toledo | F16B 12/42 160/382 |
| 2013/0279390 A1 | 10/2013 | Ohta et al. | |
| 2014/0031063 A1 | 1/2014 | Park et al. | |
| 2014/0044088 A1 | 2/2014 | Nogami et al. | |
| 2014/0044108 A1 | 2/2014 | Earnshaw et al. | |
| 2014/0068303 A1 | 3/2014 | Hildebrand et al. | |
| 2014/0177584 A1 | 6/2014 | Ouchi et al. | |
| 2014/0177601 A1* | 6/2014 | Nishio | H04W 52/146 370/332 |
| 2014/0307577 A1 | 10/2014 | Benjebbour | |
| 2014/0328230 A1 | 11/2014 | Park et al. | |
| 2015/0223235 A1 | 8/2015 | Hwang et al. | |
| 2016/0353420 A1 | 12/2016 | You et al. | |

FOREIGN PATENT DOCUMENTS

| | | |
|---|---|---|
| EP | 2 475 204 A2 | 7/2012 |
| JP | 2005-348137 A | 12/2005 |
| JP | 4323381 B2 | 9/2009 |
| KR | 10-2012-0019065 A | 3/2012 |
| RU | 2 481 615 C2 | 5/2013 |
| WO | 2012/074461 A1 | 6/2012 |
| WO | 2012/086039 A1 | 6/2012 |

OTHER PUBLICATIONS

Russian Office Action dated Jan. 24, 2018, issued in the Russian Application No. 2015142276.
Chinese Office Action dated Feb. 1, 2018, issued in the Chinese Application No. 201480024759.1.
Australian Office Action dated May 30, 2017, issued in the Australian Application No. 2014226776 dated Mar. 6, 2013.
Russian Decision on Grant dated Jun. 14, 2018, issued in Russian Application No. 2015142276.
Australian Office Action dated Sep. 21, 2017, which issued in the Australian Application No. 2014226776.
Chinese Office Action dated Dec. 10, 2018, issued in Chinese Application No. 201480024759.1.
European Office Action dated Oct. 2, 2018, issued in European Application No. 14759965.8.
Korean Office Action dated Apr. 15, 2019, issued in Korean Application No. 10-2013-0037600.
European Office Action dated Aug. 28, 2019, issued in a counterpart European Application No. 14 759 965.8—1219.
Korean Notice of Patent Grant dated Oct. 24, 2019, issued in a counterpart Korean Application No. 10-2013-0037600.
Indian Office Action dated Jan. 14, issued in a counterpart Indian Application No. 2742/MUMNP/2015.
Indian Office Action dated Jun. 16, 2022, issued in a counterpart an Indian Application No. 2742/MUMNP/2015.

* cited by examiner

MOBILE DEVICE FOR POWER REDUCTION AND METHOD THEREOF

CROSS-REFERENCE TO RELATED APPLICATION(S)

This application is a continuation application of prior application Ser. No. 16/436,128, filed on Jun. 10, 2019, which will be issued as U.S. Pat. No. 10,863,440 on Dec. 8, 2020; which is a continuation application of prior application Ser. No. 14/193,473, filed on Feb. 28, 2014, which has issued as U.S. Pat. No. 10,321,404 on Jun. 11, 2019 and was based on and claimed the benefit under 35 U.S.C. § 119(e) of a U.S. Provisional application filed on Mar. 6, 2013 and assigned Ser. No. 61/773,402, and under 35 U.S.C. § 119(a) of a Korean patent application filed on Apr. 5, 2013 in the Korean Intellectual Property Office and assigned Ser. No. 10-2013-0037600, the entire disclosure of each of which is hereby incorporated by reference.

TECHNICAL FIELD

The present disclosure relates to an electronic device. More particularly, the present disclosure relates to technology for reducing power consumption of a mobile electronic device.

BACKGROUND

Electronic devices have been developed to provide greater mobility and convenience for users. Cell phones and smartphones of the related art are representative mobile electronic devices. In the field of computers, instead of desktop computers, wireless laptops and wireless tablets are increasingly used. Digital cameras also have developed to be wirelessly operated.

Such mobile devices are supplied with power from batteries with limited capacities. Therefore, techniques for maintaining a battery for a long time using low power and extending the life of the battery are needed. In particular, as various multimedia services such as a broadcast service, a wireless internet service, a camera service, and a music playback service are provided through such mobile devices, it becomes beneficial to develop power saving techniques for efficiently saving the power of batteries of the mobile devices and extending lives thereof.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide devices and methods for saving power in a mobile electronic device.

Another aspect of the present disclosure is to provide devices and methods for extending a life of a battery of a mobile electronic device driven by the battery and provided with a wireless multimedia service.

In accordance with an aspect of the present disclosure, a mobile electronic device is provided. The mobile electronic device includes a plurality of antennas, and a transceiver, wherein the transceiver includes a control unit configured to switch to a low power mode to operate in the low power mode, or to operate at least one of the plurality of antennas in the low power mode when a data non-transmission period occurs in an active state.

In accordance with another aspect of the present disclosure, a mobile electronic device is provided. The mobile electronic device includes a plurality of antennas, and a transceiver, wherein the transceiver includes a control unit configured to block at least one path between the transceiver and the plurality of antennas when a data non-transmission period occurs in an active state.

In accordance with another aspect of the present disclosure, a mobile electronic device is provided. The mobile electronic device includes a transceiver including a plurality of components, wherein the transceiver includes a control unit configured to adjust power supplied to at least one of the plurality of components to a low-power mode when a data non-transmission period occurs in an active state.

In accordance with another aspect of the present disclosure, a method for reducing power consumption of a mobile electronic device including a plurality of antennas and a transceiver is provided. The method includes detecting occurrence of a data non-transmission period in an active state, and operating the transceiver in a low power mode or operating at least one of the plurality of antennas in the low power mode through switching to the low power mode when the occurrence of the data non-transmission period is detected in the active state.

In accordance with another aspect of the present disclosure, a method for reducing power consumption of a mobile electronic device including a plurality of antennas and a transceiver is provided. The method includes detecting occurrence of a data non-transmission period in an active state, and blocking at least one path between the transceiver and the plurality of antennas when the occurrence of the data non-transmission period is detected in the active state.

In accordance with another aspect of the present disclosure, a method for reducing power consumption of a mobile electronic device including a transceiver having a plurality of components is provided. The method includes detecting occurrence of a data non-transmission period in an active state, and making a low-power adjustment of power supplied to at least one of the plurality of components to a low-power mode when the occurrence of the data non-transmission period is detected in the active state.

In accordance with another aspect of the present disclosure, a mobile electronic device is provided. The mobile electronic device includes a plurality of antennas, a transceiver, and a control unit configured to switch to a low power mode to operate the transceiver in the low power mode, or to operate at least one of the plurality of antennas in the low power mode when a data non-transmission period occurs in an active state.

In accordance with another aspect of the present disclosure, a mobile electronic device is provided. The mobile electronic device includes a plurality of antennas, a transceiver, and a control unit configured to block at least one path between the transceiver and the plurality of antennas when a data non-transmission period occurs in an active state.

In accordance with another aspect of the present disclosure, a mobile electronic device is provided. The mobile electronic device includes a transceiver including a plurality of components, and a control unit configured to adjust power supplied to at least one of the plurality of components to a low-power mode when a data non-transmission period occurs in an active state.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description when taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

In this specification, FIGS. 1 to 10C and the various embodiments are used to merely describe the principles of the present disclosure, and thus should not be construed as limitations on the scope of the present disclosure.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described below relate to devices and methods for saving power in a mobile electronic device. Various embodiments of the present disclosure are applied to terminals such as smartphones and cell phones that access a wireless communication network such as a $3^{rd}$ Generation (3G) system or a $4^{th}$ Generation (4G) Long Term Evolution (LTE) system to perform communication. However, it will be understood by those skilled in the art that various embodiments of the present disclosure may also be applied to electronic devices such as wirelessly accessible laptops, tablets, digital cameras driven by batteries, and the like.

State transition operations for supporting low-power communications in terminals of 3G and 4G wireless communication systems are described below. Power mode transition operations for power saving operations in the terminals according to various embodiments of the present disclosure will also be described. Power saving operations according to various embodiments of the present disclosure will also be described.

Figure 1:
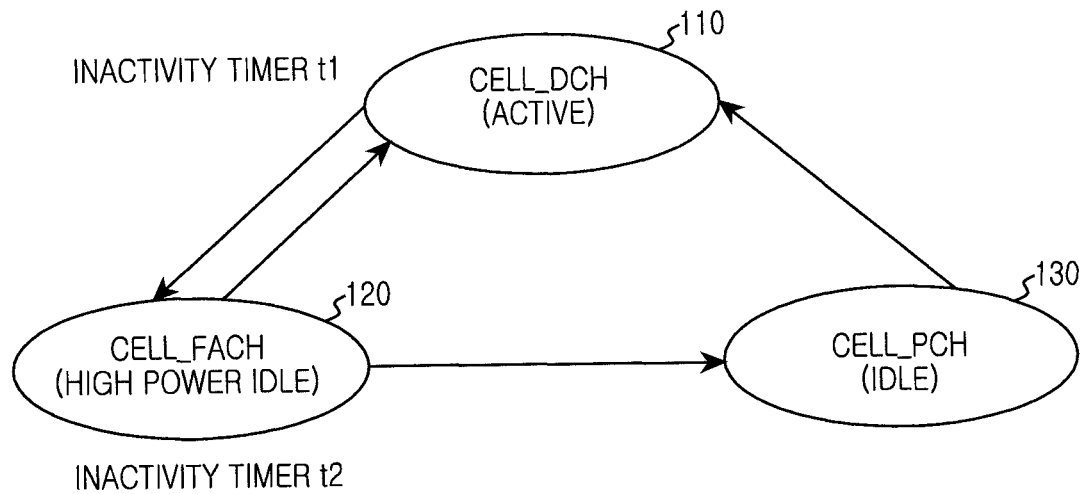
FIG. 1 is a diagram illustrating a state transition of Radio Resource Control (RRC) in a 3rd Generation (3G) communication system according to an embodiment of the present disclosure.

FIG. 1 is a diagram illustrating a state transition of Radio Resource Control (RRC) in a 3G communication system according to an embodiment of the present disclosure. 3rd Generation Partnership Project (3GPP) wireless communication standards support low-power communication by controlling a transmitting/receiving state of a terminal through RRC.

Referring to FIG. 1, in a Cell_Dedicated Channel (CELL_DCH) state 110, a terminal is in an active state and may instantly transmit or receive data. Because both a Receiver (Rx) and a Transmitter (Tx) are operating, power consumption is high. In a cell_forward access channel (CELL_FACH) state 120, the terminal is in a high power idle state and may instantly respond to a request from a base station. In this state, only a downlink (DL) is operated. Because the Tx does not consume power, power consumption is lower than that of the CELL_DCH state 110. However, because the Rx is activated, power is continuously consumed. In a cell_paging channel (CELL_PCH) or (URA_PCH) state 130, the terminal is in an idle state and may receive only paging from a base station. In this state, only the DL is periodically woken up to monitor the paging. Because a period where a modulator and demodulator (modem) is active is minimized, power consumption is low in comparison with the CELL_DCH state 110 or the CELL_FACH state 120. According to 3GPP standards, an inactivity timer t1 is defined for a state transition from the CELL_DCH state 110 to the CELL_FACH state 120, and an inactivity timer t2 is defined for a state transition from the CELL_FACH state 120 to the CELL_PCH state 130. As will be discussed in more detail with reference to FIG. 8A, after a period P2 where data transmission occurs, the base station changes the CELL_DCH state 110 to the CELL_FACH state 120 after waiting for inactivity timer t1 to trigger the transition. Here, the inactivity timer represents a redundant wait time that passes in a state where data transmission does not occur before the state transition. That is, the inactivity timer t1 represents a time for waiting in the state where data transmission does not occur before the CELL_DCH state 110 is changed to the CELL_FACH state 120, and the inactivity timer t2 represents a time for waiting until the CELL_FACH state 120 is changed to the CELL_PCH state 130.

Referring to a 3GPP network, the base station monitors data traffic and initiates the state transitions of RRC so as to minimize power consumption of the terminal. However, for the state transition of RRC, an additional signal message may be transmitted/received, thus causing overhead. Further, in the case where a period of traffic stop is sufficiently long, i.e. in the case where an inactivation period is greater than a determined value of inactivity timer, the state transition of RRC occurs. For example, in the case where data transmission does not occur during the inactivity timer t1, the CELL_DCH state 110 is changed to the CELL_FACH state 120. Further, in the case where the data transmission still does not occur during the inactivity timer t2, the CELL_FACH state 120 is changed to the CELL_PCH state 130.

Figure 2:
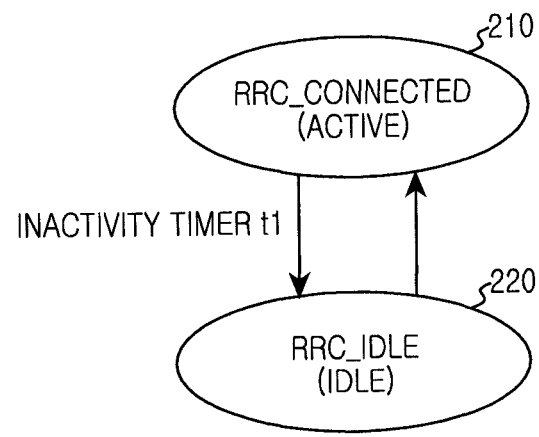
FIG. 2 is a diagram illustrating a state transition of RRC in a 4th Generation (4G) communication system according to an embodiment of the present disclosure.

FIG. 2 is a diagram illustrating a state transition of RRC in a 4G communication system according to an embodiment of the present disclosure.

Referring to FIG. 2, an RRC_CONNECTED state 210 is an active state in which transmission/reception of data is enabled. In this state, power consumption of a transmitter/receiver is high. An RRC_IDLE state 220 is an idle state in which only reception of paging is enabled. In the case of the 4G system, when data transmission does not occur during the inactivity timer t1, the RRC_CONNECTED state 210 is changed to the RRC_IDLE state 220 to thereby reduce power consumption.

Besides the above-described low-power operation methods, a method of controlling a physical layer regardless of the RRC state may be considered. For example, a diversity antenna may be switched off. However, according to this method, due to reception performance degradation, a data transmission time becomes longer, and thus power consumption may increase.

As described above, in the case of the low-power operation method by the state transmission of RRC, a message overhead and transition time are great. Therefore, the state transition is allowed to occur only when a data stop period is 5-10 seconds or longer to be sufficiently long by increasing the inactivity timer. However, as wireless communication standards develop, a data transmission rate greatly increases, and thus a period used for actual data transmission in a high-power operation state of a terminal greatly decreases. Therefore, the low-power operation method by the state transition of RRC is limited in terms of reduction of power consumed in a data non-transmission period. In the case of the low-power operation method for the physical layer, a data reception rate may decrease. Thus, application of this method is limited.

In order to overcome the limitations, according to various embodiments of the present disclosure, in the active state, i.e. the CELL_DCH or RRC_CONNECTED state, a data transmission state is observed to operate a terminal in a low-power mode when a data non-transmission period where data transmission/reception does not occur is detected.

Figure 3:
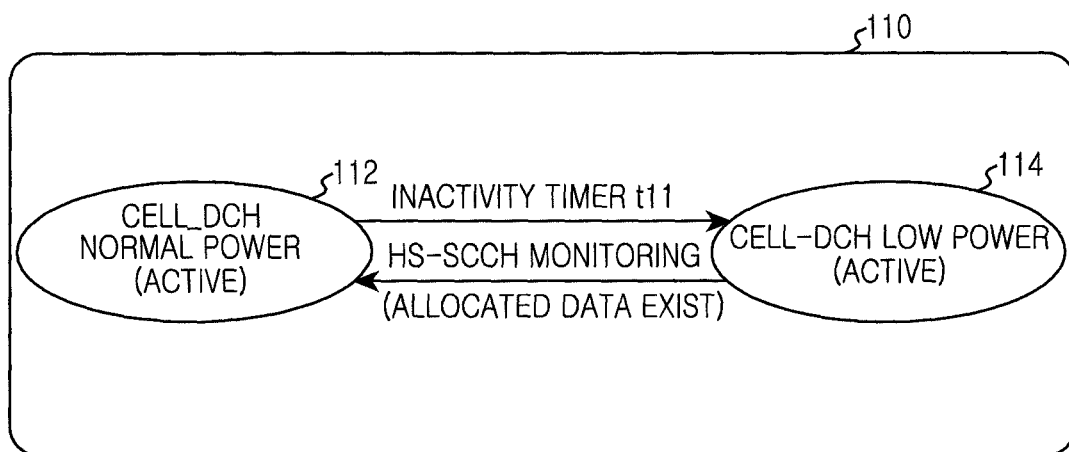
FIG. 3 is a diagram illustrating a transition of a power mode in a 3G communication system according to an embodiment of the present disclosure.

FIG. 3 is a diagram illustrating a transition of a power mode in a 3G communication system according to an embodiment of the present disclosure.

Referring to FIG. 3, the active state illustrated in FIG. 1, i.e. the CELL_DCH state 110, is divided into a CELL_DCH normal power mode 112 and a CELL_DCH low power mode 114. The terminal switches from the CELL_DCH normal power mode 112 to the CELL_DCH low power mode 114 after a lapse of an inactivity timer t11 that is smaller than t1. That is, when the data non-transmission period where data transmission/reception does not occur for the predefined time t11 is detected, in the active state where data transmission/reception is enabled, the terminal switches from the CELL_DCH normal power mode 112 to the CELL_DCH low power mode 114. Here, the predefined time t11 is shorter than the time t1 that is defined for transition from the active state 110 to the high-power idle state 120 as illustrated in FIG. 1. Thereafter, when it is determined that there is data to be transmitted or received by detecting a control channel (e.g. a high speed-shared control channel (HS-SCCH)), the terminal returns to the CELL_DCH normal power mode 112 from the CELL_DCH low power mode 114. For example, when it is determined that there is data allocated to the terminal, i.e. data to be received by the terminal, by detecting the HS-SCCH from the base station, the terminal returns to the CELL_DCH normal power mode 112 from the CELL_DCH low power mode 114. For another example, when it is determined that there is data to be transmitted to the base station, the terminal returns to the CELL_DCH normal power mode 112 from the CELL_DCH low power mode 114. In this manner, after the terminal switches to the active state, power consumption may be reduced in a period where data transmission/reception does not occur.

Figure 4:
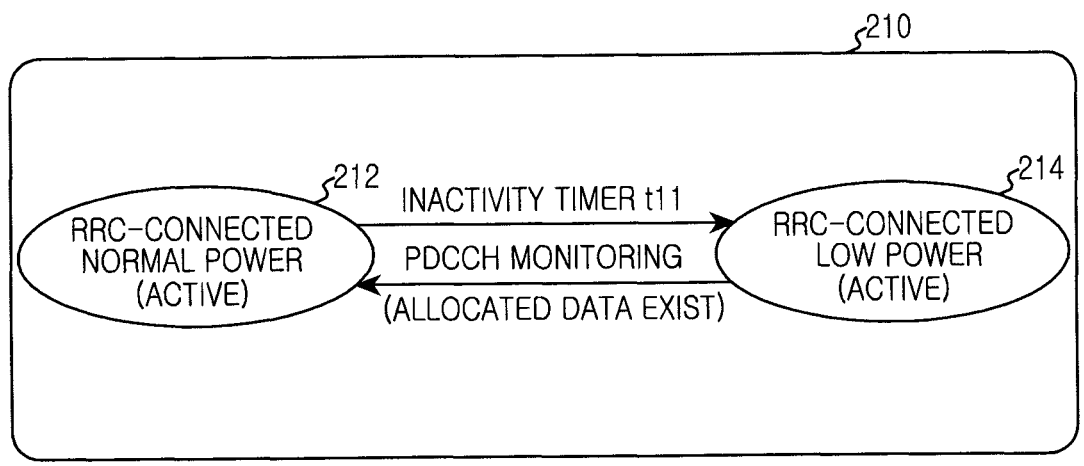
FIG. 4 is a diagram illustrating a transition of a power mode in a 4G communication system according to an embodiment of the present disclosure.

FIG. 4 is a diagram illustrating a transition of a power mode in a 4G communication system according to an embodiment of the present disclosure.

Referring to FIG. 2, the RRC_CONNECTED state 210 is divided into an RRC_CONNECTED normal power mode 212 and an RRC_CONNECTED low power mode 214. The terminal switches from the RRC_CONNECTED normal power mode 212 to the RRC_CONNECTED low power mode 214 after a lapse of an inactivity timer t11 that is smaller than t1. That is, when the data non-transmission period where data transmission/reception does not occur for the predefined time t11 is detected, in the active state where data transmission/reception is enabled, the terminal switches from the RRC_CONNECTED normal power mode 212 to the RRC_CONNECTED low power mode 214. Here, the predefined time t11 is shorter than the time t1 that is defined for transition from the active state 210 to the idle state 220 as illustrated in FIG. 2. Thereafter, when it is determined that there is data to be transmitted/received, the terminal returns to the RRC_CONNECTED normal power mode 212 from the RRC_CONNECTED low power mode 214. For example, when it is determined that there is data allocated to the terminal, i.e. data to be received by the terminal, by detecting a Physical Downlink Control Channel (PDCCH) from the base station, the terminal returns to the RRC_CONNECTED normal power mode 212 from the RRC_CONNECTED low power mode 214. For another example, when it is determined that there is data to be transmitted to the base station, the terminal returns to the RRC_CONNECTED normal power mode 212 from the RRC_CONNECTED low power mode 214. In this manner, after the terminal switches to the active state, power consumption may be reduced in a period where data transmission/reception does not occur.

FIGS. 5A to 5D are block diagrams illustrating a mobile electronic device for a power saving operation according to an embodiment of the present disclosure. These configurations are merely examples of applying various embodiments of the present disclosure to a wireless terminal. Therefore, it should be noted that various embodiments of the present disclosure are not limited to the configurations and may be used in other similar electronic devices.

Figure 5A:
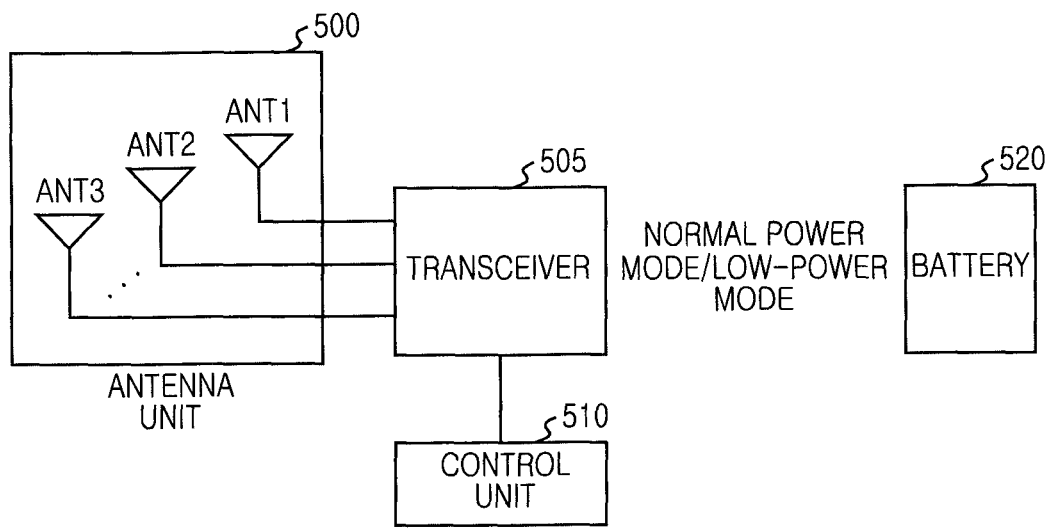
FIGS. 5A, 5B, 5C, and 5D are block diagrams illustrating a mobile electronic device for a power saving operation according to various embodiments of the present disclosure.
Figure 5B:
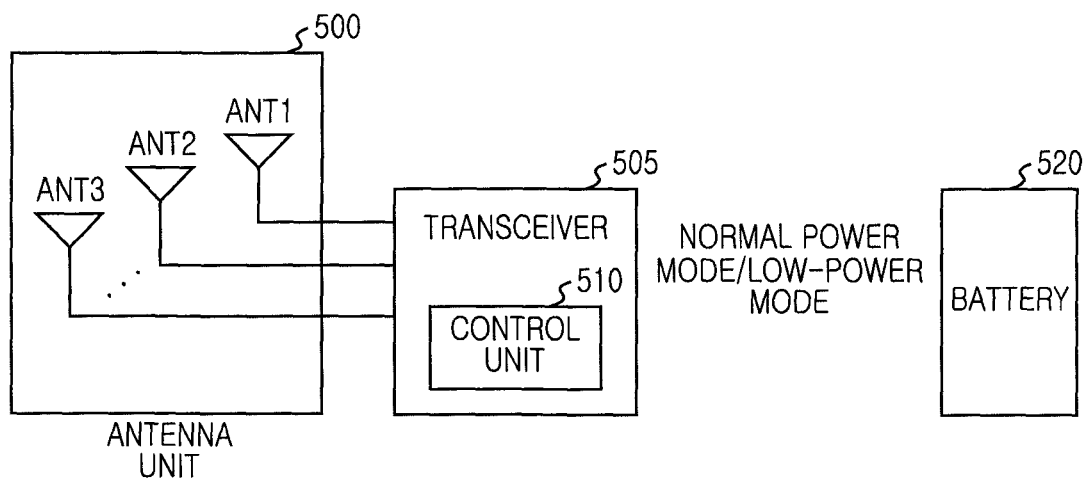
Figure 5C:
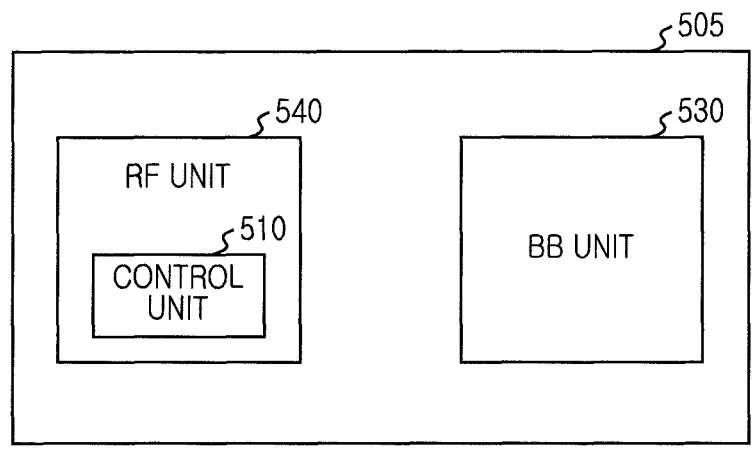
Figure 5D:
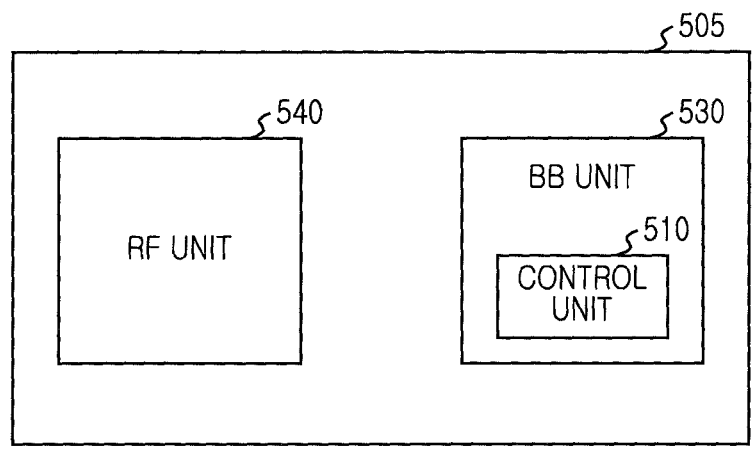

Referring to FIGS. 5A to 5D, the mobile electronic device includes a control unit 510, a battery 520, a transceiver 505, and an antenna unit 500. The antenna unit 500 includes a plurality of antennas ANT1 to ANT3. The battery 520 supplies operating power to components of the electronic device. The transceiver 505 performs a transmission process to a signal to be transmitted and performs a reception process to a received signal. As illustrated in FIGS. 5C and 5D, the transceiver 505 may include a Baseband (BB) unit 530 and a radio frequency (RF) unit 540. For example, as illustrated in FIGS. 5A and 5B, the transceiver 505 may be implemented as a single chip. For another example, as illustrated in FIGS. 5C and 5D, the transceiver 505 may be implemented as two chips. For another example, the transceiver 505 may be implemented as three or more chips.

Figure 10A:
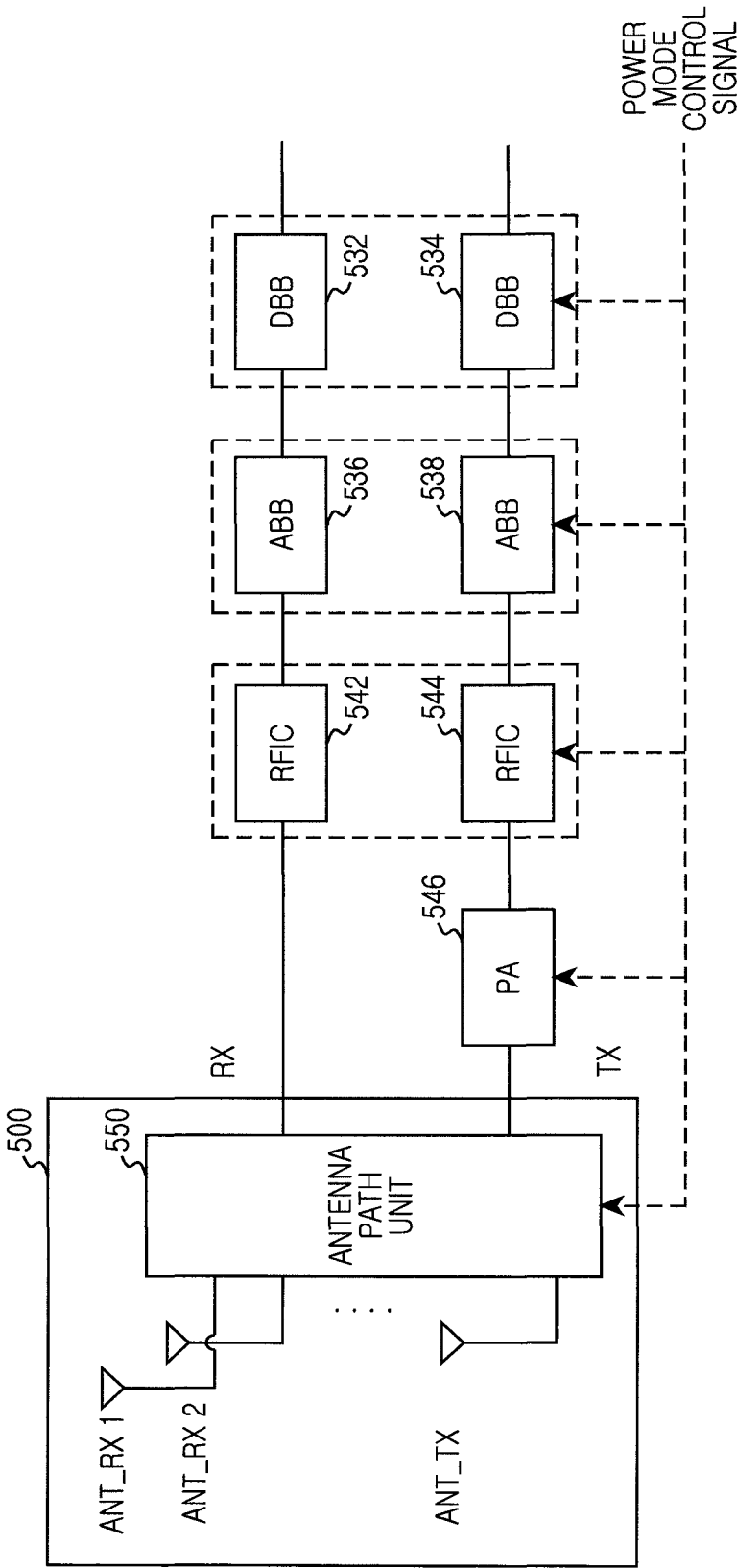
FIGS. 10A, 10B, and 10C are diagrams illustrating various modifications of a power saving operation according to various embodiments of the present disclosure.
Figure 10B:
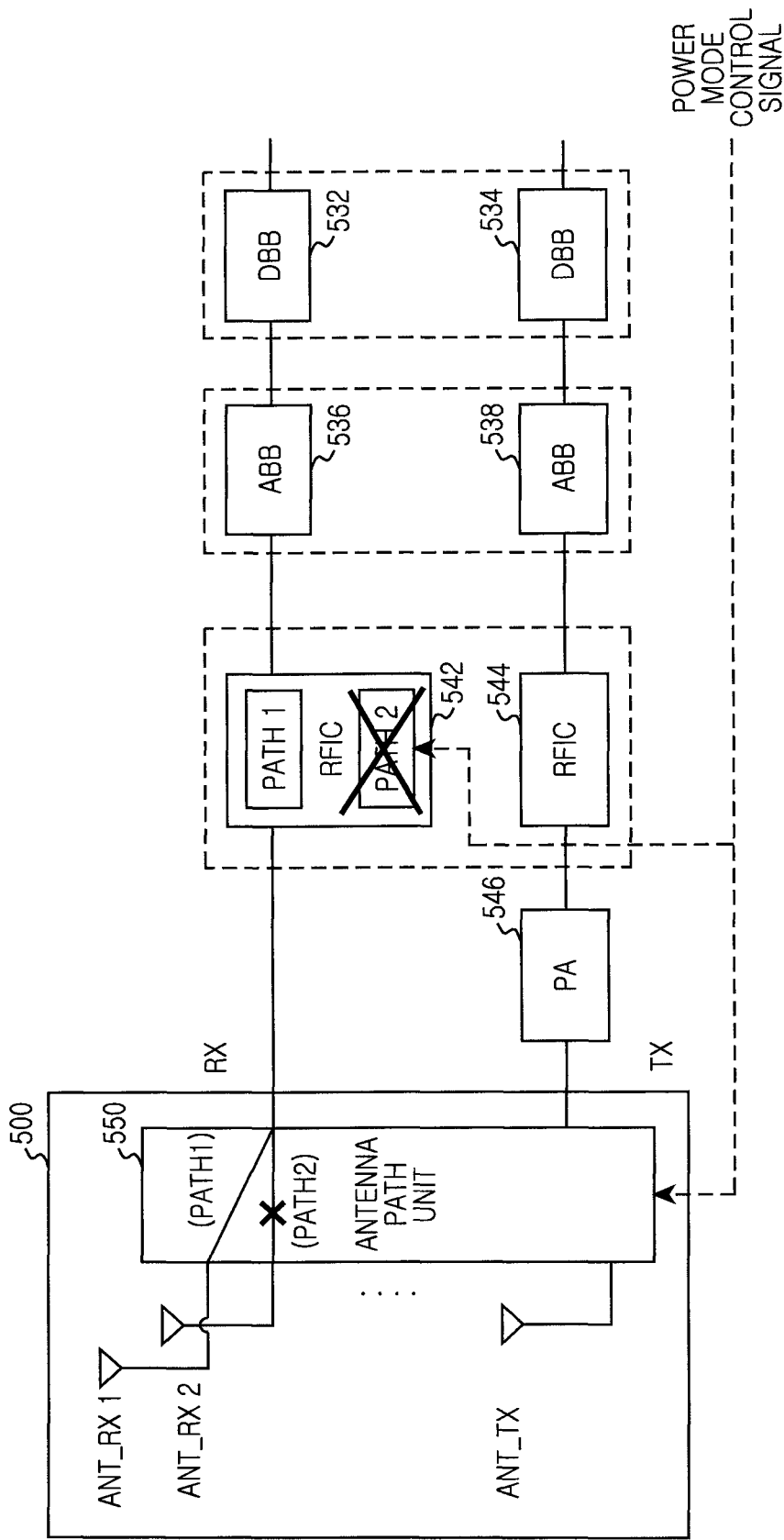
Figure 10C:
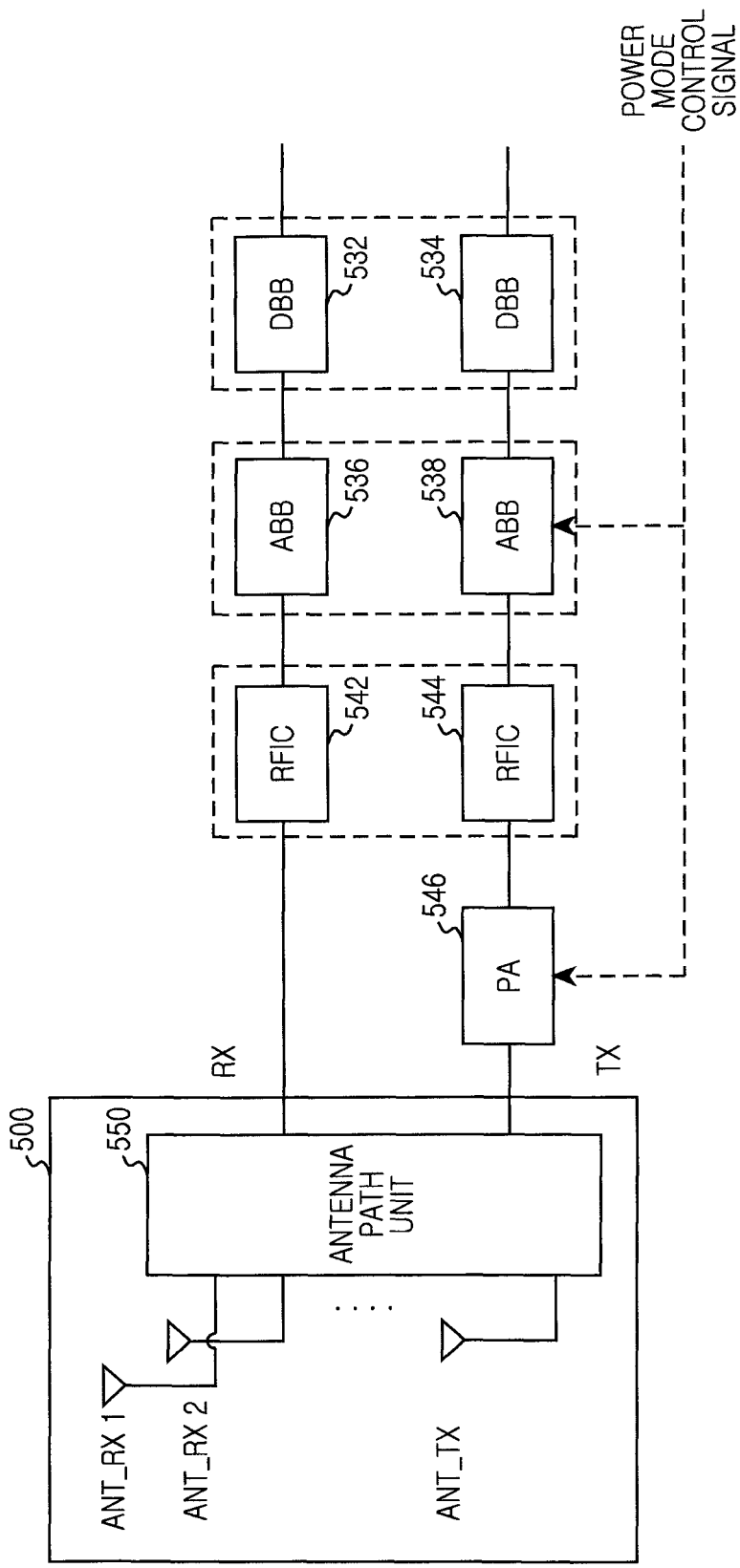

The BB unit 530 of the transceiver 505 processes data to be transmitted in a baseband, and processes received data processed in the RF unit 540 in the baseband. For example, as shown in FIGS. 10A to 10C, the BB unit 530 may include digital BB units 532 and 534 having processors and memories and analog BB units 536 and 538 having Analog-to-Digital Converters (ADCs) and filters. The RF unit 540 performs an RF process to the data to be transmitted, which have been processed in the BB unit 530, and performs the RF process to the data received through the antenna unit 500. For example, the RF unit 540 may include an analog filter, a Low-Noise Amplifier (LNA), a mixer, a Voltage-Controlled Oscillator (VCO), a frequency synthesizer, and a Power Amplifier (PA). The plurality of antennas ANT1 to ANT3 included in the antenna unit 500 is for signal transmission between the base station and the mobile electronic device, i.e. the wireless terminal, in a wireless communication system. Although it is illustrated that the plurality of antennas are not classified into transmitting antennas and receiving antennas, the plurality of antennas may include an appropriate number of transmitting antennas and an appropriate number of receiving antennas.

The control unit 510 controls a power saving operation according to various embodiments of the present disclosure. To this end, the control unit 510 controls the transceiver 505 and controls an operation of a timer (not illustrated) (e.g. inactivity timer t1, t11, and t2). That is, the control unit 510 may control the transceiver 505 so that the transceiver 505 is operated in a normal power mode or a low power mode. The normal power mode represents a mode in which power is normally supplied. This normal power mode is a relatively high power mode in comparison with the low power mode. On the contrary, the low power mode is a mode for reducing power consumption of the mobile electronic device. In this mode, power is adjusted to be supplied in comparison with the case where power is normally supplied.

Referring to FIG. 5A, the control unit 510 may be separated from the transceiver 505. For another example, as illustrated in FIG. 5B, the control unit 510 may be included in the transceiver 505. In the case where the control unit 510 is included in the transceiver 505 and the transceiver 505 includes the BB unit 530 and the RF unit 540, the control unit 510 may be included in the BB unit 530 or the RF unit 540.

For example, in the low power mode, partial antennas from among the plurality of antennas ANT1 to ANT3 included in the antenna unit 500 may be turned off. As illustrated in FIG. 10A, the control unit 510 may control an antenna path unit 550 in response to a power mode control signal so as to block paths between the partial antennas and the transceiver 505, thereby turning off the partial antennas. Here, power supplied to corresponding components of the RF unit (e.g. the analog filter, low-noise amplifier, and mixer) is also blocked. Although it is illustrated that the antenna unit 500 includes only the plurality of antennas ANT1 to ANT3, this configuration is just an example. For another example, the antenna unit 500 may include partial elements (e.g. capacitor) supplied with power, in addition to the plurality of antennas ANT1 to ANT3. In this case, the operation of turning off the partial antennas may include an operation of blocking the paths between the partial antennas and the transceiver 505 and an operation of blocking the power supplied to the partial elements. By blocking only the power supplied to the partial elements, an effect of power saving may be obtained. By additionally blocking the power supplied to the corresponding components of the RF unit, the power saving effect may be improved.

For another example, an adjusted voltage supplied in the low power mode may have a lower level than that of a voltage normally supplied to partial components (e.g. power amplifier) of the transceiver 505. For another example, an adjusted voltage supplied in the low power mode may be a voltage that enables partial components (e.g. analog-to-digital converter) of the transceiver 505 to perform only partial operations (e.g. 5-stage conversion operation) of normal operations (e.g. 10-stage conversion operation).

In one embodiment, the control unit 510 changes a power mode of the electronic device into the low power mode when a data non-transmission period is detected during a predefined time in an active state. The predefined time may be set to be shorter that a time set to change the active state to an idle state.

The control unit 510 detects the data non-transmission period where data transmission/reception does not occur during the predefined time by monitoring a control channel or transmission data in the active state. When the control unit 510 detects that there is data to be received as a result of monitoring the control channel in the low power mode, the control unit 510 further performs an operation of changing a power supply mode of the electronic device into the normal power mode. When the control unit 510 detects that there is data to be transmitted as a result of monitoring the transmission data in the low power mode, the control unit 510 further performs the operation of changing the power supply mode of the electronic device into the normal power mode. The control channel may be one of the HS-SCCH and the PDCCH.

In the low power mode, the control unit 510 low-power adjusts power supplied to a partial component of the electronic device. The partial component of the electronic device may be one of the radio frequency unit and the baseband unit. When the data non-transmission period where data reception does not occur for the predefined time is detected in the active state, the partial component of the electronic device may be a component on a reception path. When the data non-transmission period where data transmission does not occur for the predefined time is detected in the active state, the partial component of the electronic device may be a component on a transmission path.

In another embodiment, the control unit 510 blocks at least one of the paths between the transceiver and the plurality of antennas when the data non-transmission period is detected during the predefined time in the active state where data transmission/reception is enabled. The transceiver includes the radio frequency unit and the baseband unit. The predefined time may be set to be shorter that the time set to change the active state to the idle state.

The control unit 510 detects the data non-transmission period where data transmission/reception does not occur during the predefined time by monitoring the control channel or transmission data in the active state. When the control unit 510 detects that there is data to be transmitted/received as a result of monitoring the control channel or transmission data, the control unit 510 further performs an operation of opening the blocked paths between the transceiver and the plurality of antennas. The control channel may be one of the HS-SCCH and the PDCCH.

In another embodiment, the control unit 510 low-power adjusts power supplied to at least one of a plurality of components included in the transceiver when the data non-transmission period is detected during the predefined time in the active state where data transmission/reception is enabled. The transceiver includes the radio frequency unit and the baseband unit. The predefined time may be set to be shorter than a time set to change the active state to an idle state.

The control unit 510 detects the data non-transmission period where data transmission/reception does not occur during the predefined time by monitoring the control channel or transmission data in the active state. When the control unit 510 detects that there is data to be transmitted/received as a result of monitoring the control channel or transmission data, the control unit 510 further performs an operation of normalizing the low-power adjusted power. The control channel may be one of the HS-SCCH and the PDCCH.

Figure 6:
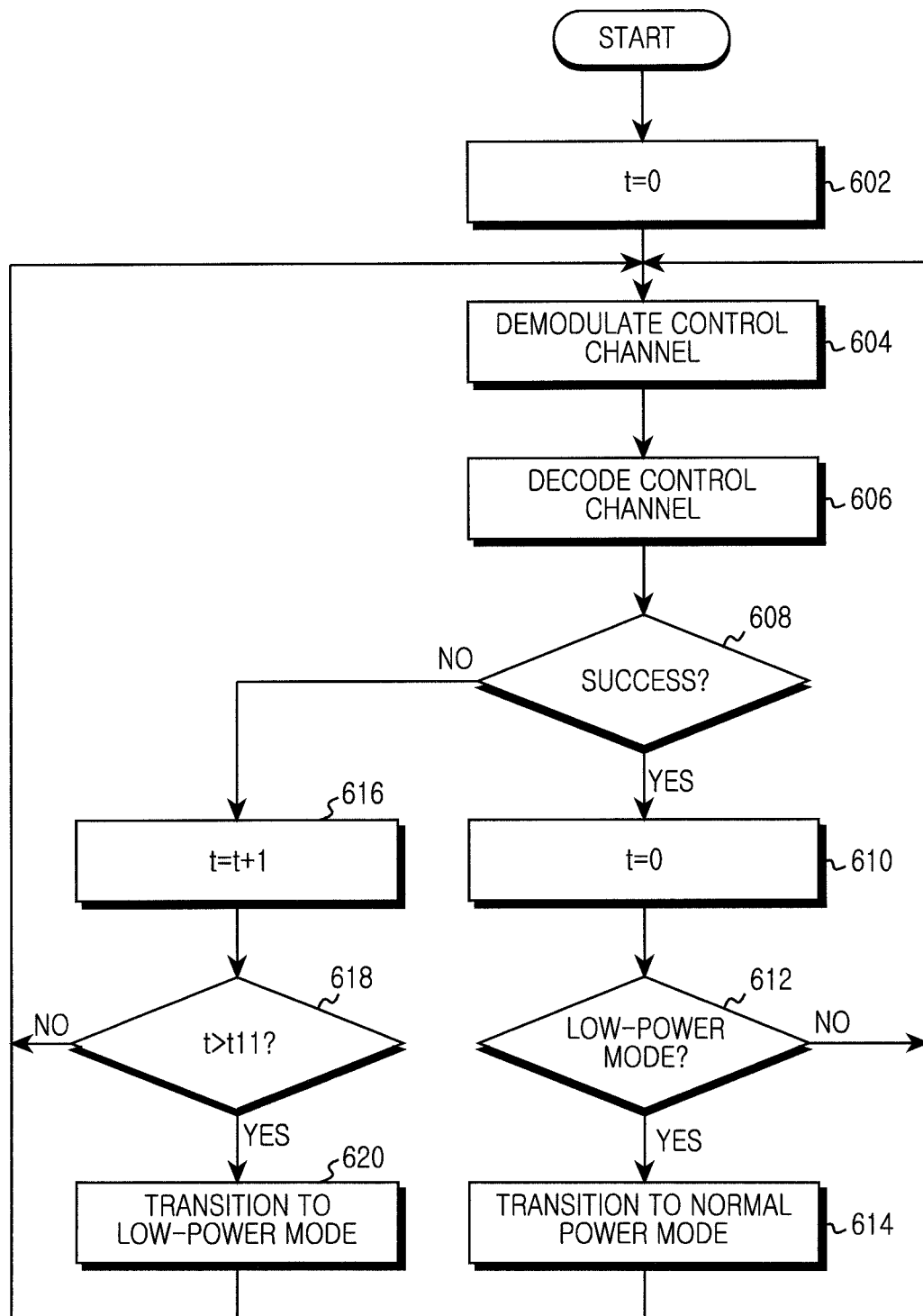
FIG. 6 is a flowchart illustrating a process of a power saving operation according to an embodiment of the present disclosure.

FIG. 6 is a flowchart illustrating a process of a power saving operation according to an embodiment of the present disclosure. This process may be controlled by the control unit 510 illustrated in FIGS. 5A to 5D. Here, it will be exemplarily described that the power saving operation is performed in the case of a downlink from a base station to a terminal. However, it should be noted that this power saving operation may be performed in substantially the same manner in the case of an uplink from the terminal to the base station.

Referring to FIG. 6, a timer value is initialized to be 0 in operation 602. In operations 604 and 606, demodulation and decoding operations are periodically performed to the control channel such as the HS-SCCH or PDCCH. When it is detected that a result of the decoding operation is successful in operation 608, it is determined that there is data to be transmitted from the base station to the terminal, and the timer value is initialized to be 0 in operation 610. It is determined whether a current power mode is the low power mode in operation 612. In the case of the low power mode, the power mode is changed to the normal power mode to receive data in operation 614. In the case of the normal power mode, the process proceeds to operation 604. According to data packets arriving in each cycle, the operations of the right loop (604→606→608→610→612 or 604→606→608→610→612→614) are repeated.

When a data packet is not received, a result of the decoding operation for the control channel such as the HS-SCCH or PDCCH is determined to be a failure. When the result of the decoding operation is determined to be a failure, the timer value increases in operation 616. The operations of the left loop (604→606→608→616→618) are repeatedly performed until the timer value reaches t11. When it is determined that the timer value reaches t11 in operation 618, it is determined that the data packets are not received for a while, and the power mode is changed to the low power mode in operation 620.

Figure 7:
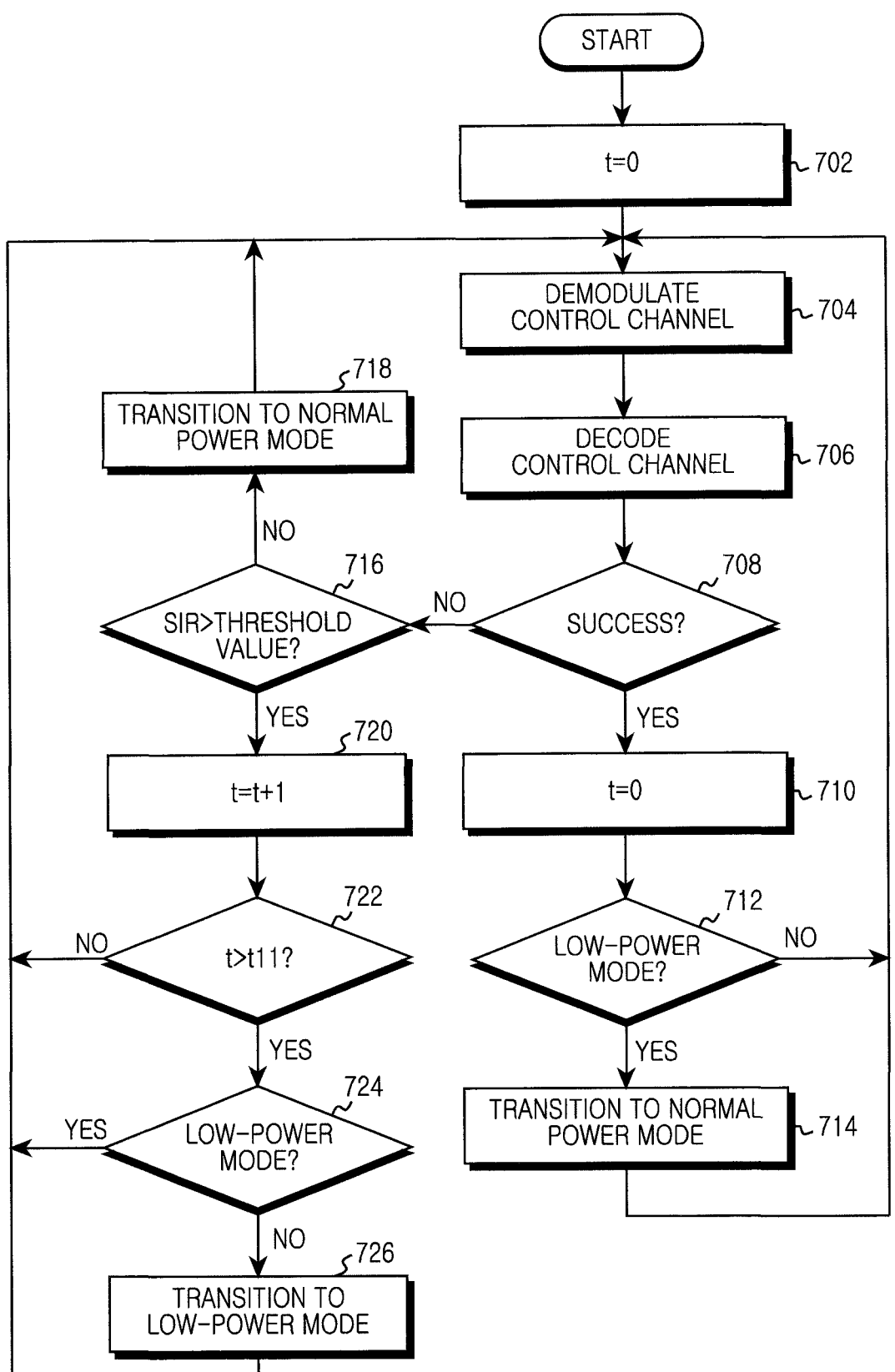
FIG. 7 is a flowchart illustrating a process of a power saving operation according to another embodiment of the present disclosure.

FIG. 7 is a flowchart illustrating a process of a power saving operation according to another embodiment of the present disclosure. This process may be controlled by the control unit 510 illustrated in FIGS. 5A to 5D. Here, it will be exemplarily described that the power saving operation is performed in the case of a downlink from a base station to a terminal. However, it should be noted that this power saving operation may be performed in substantially the same manner in the case of an uplink from the terminal to the base station. Operations 702 to 714 are the same as operations 602 to 614 illustrated in FIG. 6, and operations 720, 722, and 726 are the same as operations 616, 618, and 620 illustrated in FIG. 6. That is, the process illustrated in FIG. 7 further includes operations 716, 718, and 724 in comparison with the process illustrated in FIG. 6.

Referring to FIG. 7, before switching to the low power mode after reception of data is stopped, it is determined whether signal quality is sufficiently high to decode a control channel that will be possibly received. When a data packet is not received in the left loop, a result of the decoding operation of the control channel such as the HS-SCCH or PDCCH is determined to be a failure. In operation 716, a value of signal quality such as a Signal to Interference Ratio (SIR) is determined. When the signal quality value is greater than a threshold value, the power mode is changed to the low power mode in operation 726. When the signal quality value is not greater than the threshold value, the power mode is changed to the normal power mode in operation 718. That is, the SIR level is determined again in order to decode the common control channel such as the HS-SCCH or PDCCH that indicates data that will possibly arrive, even after data transmission is stopped.

Figure 8A:
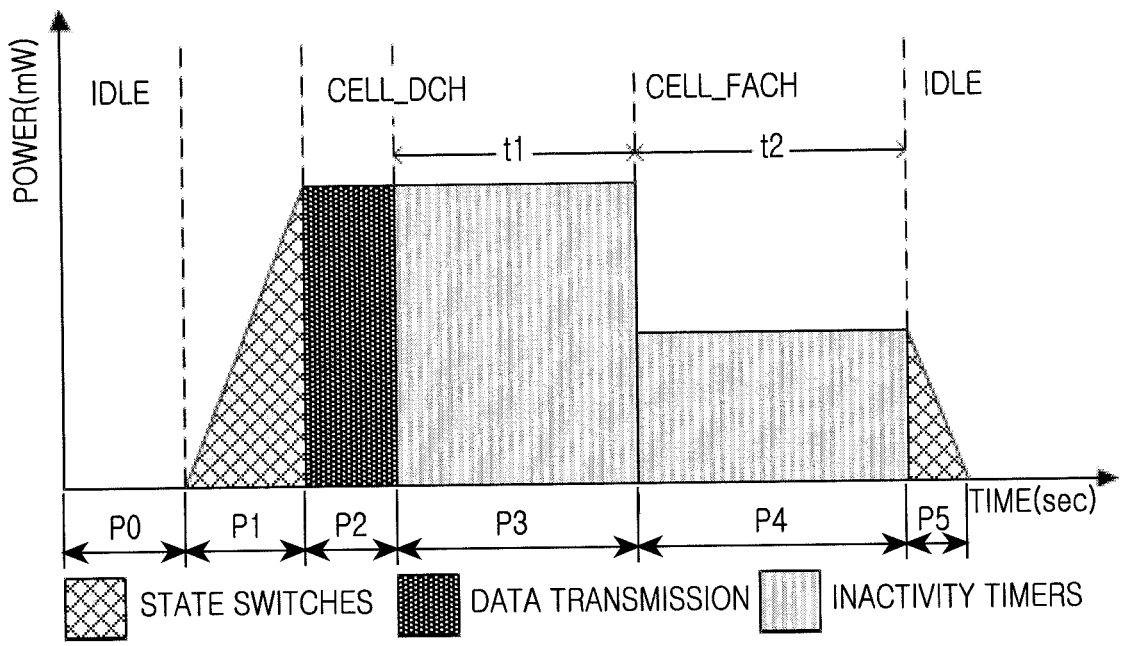
FIG. 8A is a diagram illustrating that power consumption is reduced according to the related art.
Figure 8B:
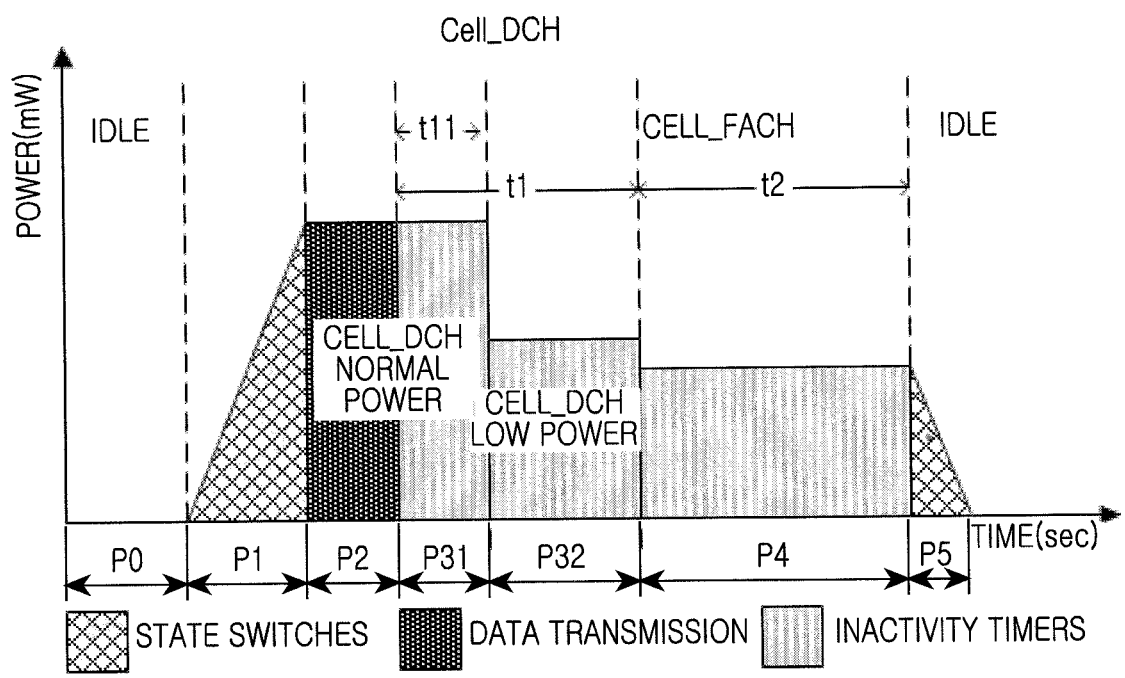
FIG. 8B is diagram illustrating that power consumption is reduced according to an embodiment of the present disclosure.

FIGS. 8A and 8B are diagrams illustrating that power consumption is reduced according to embodiments of the present disclosure.

FIG. 8A illustrates power consumption according to state transition in a 3G communication system of the related art, and FIG. 8B illustrates power consumption in accordance with a power saving operation according to the embodiments of the present disclosure.

Referring to FIG. 8A, data transmission is stopped, and high power of CELL_DCH state is consumed during the inactivity time of t1 (period P3) by a command from a base station. On the contrary, referring to FIG. 8B, the power of CELL_DCH state is consumed only during the time t11 (period P31) that is shorter than t1, and then the power mode is changed to the CELL_DCH low power mode during the time of t1-t11 (period P32). In the CELL_DCH low power mode, power is less consumed than in the CELL_DCH state, i.e. CELL_DCH high power mode. Thus, by as much as this difference, power consumption may be reduced.

Figure 9A:
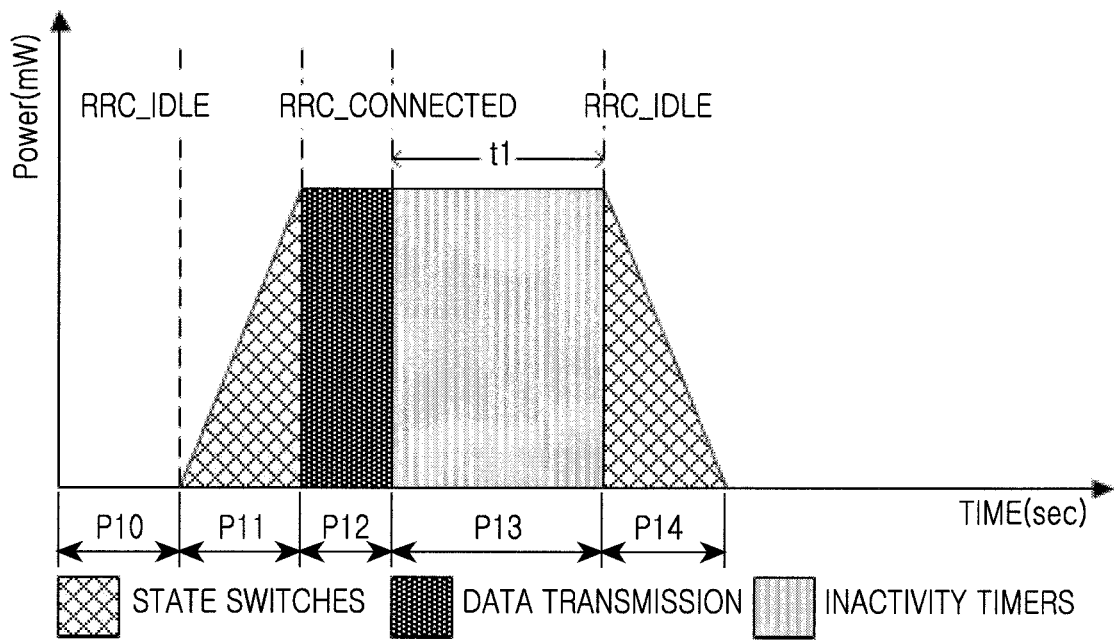
FIG. 9A is a diagram illustrating that power consumption is reduced according to the related art.
Figure 9B:
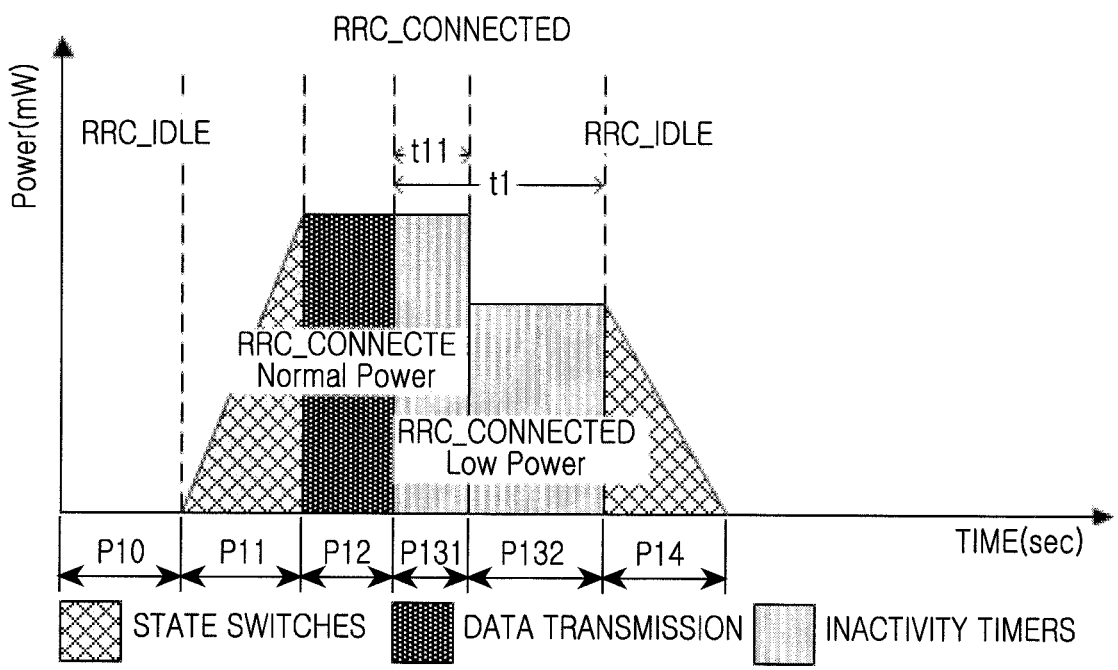
FIG. 9B is a diagram illustrating that power consumption is reduced according to an embodiment of the present disclosure.

FIGS. 9A and 9B are diagrams illustrating that power consumption is reduced according to embodiments of the present disclosure. FIG. 9A illustrates power consumption according to state transition in a 4G communication system of the related art, and FIG. 9B illustrates power consumption in accordance with a power saving operation according to an embodiment of the present disclosure.

Referring to FIG. 9A, data transmission is stopped and high power of RRC_CONNECTED state is consumed during the inactivity time of t1 (period P13) by a command from a base station. On the contrary, referring to FIG. 9B, the power of RRC_CONNECTED state is consumed only during the time t11 (period P131) that is shorter than t1, and then the power mode is changed to the RRC_CONNECTED low power mode during the time of t1-t11 (period P132). In the RRC_CONNECTED low power mode, power is less consumed than in the RRC_CONNECTED state, i.e. RRC_CONNECTED normal power mode. Thus, by as much as this difference, power consumption may be reduced.

FIGS. 10A to 10C are diagrams illustrating various modifications of a power saving operation according to embodiments of the present disclosure. These diagrams illustrate various examples of the power saving operation performed by the control unit 510 illustrated in FIGS. 5A to 5D.

FIG. 10A is a diagram illustrating a power saving operation performed according to an embodiment of the present disclosure.

Referring to FIG. 10A, it is exemplarily illustrated that the transceiver 505 includes Digital BB (DBB) units 532 and 534, Analog BB (ABB) units 536 and 538, RF integrated circuits (ICs) 542 and 544, and a Power Amplifier (PA) 546. However, it should be noted that various embodiments of the present disclosure are not limited thereto. The DBB units 532 and 534 and the ABB units 536 and 538 constitute the BB unit of the transceiver 505. The RF ICs 542 and 544 and the power amplifier 546 constitute the RF unit of the transceiver 505. The DBB unit 532, the ABB unit 536, and the RF IC 542 are components on a reception path, and the DBB unit 534, the ABB unit 538, the RF IC 544, and the power amplifier 546 are components on a transmission path. Here, this division of the components of the transceiver is merely for differentiating the components by the transmission and reception paths and functions based on data processing operations. Therefore, in the case where the components are actually implemented as chips, the components may be differently implemented. For example, the DBB units 532 and 534 and the ABB units 536 and 538 may be implemented as a single chip. For another example, the DBB units 532 and 534 may be implemented as a single chip, and the ABB units 536 and 538 may be implemented as another single chip. For another example, the RF ICs 542 and 544 may be implemented as a single chip. For another example, the DBB units 532 and 534, the ABB units 536 and 538, and the RF ICs 542 and 544 may be implemented as a single chip. The DBB units 532 and 534 may include a processor, a memory and etc. The ABB units 536 and 538 may include an ADC, filter and etc. The RF ICs 542 and 544 may include an analog filter, a low noise amplifier, a mixer, a VCO, a frequency synthesizer and etc.

In the antenna path unit 550, transmitting antennas and receiving antennas may be combined. Although it is illustrated that one transmitting antenna ANT_TX is combined with two receiving antennas ANT_RX1 and ANT_RX2, the numbers of the antennas are not limited. The antenna path unit 550 forms reception paths between the receiving antennas ANT_RX1 and ANT_RX2 and a receiver (RF IC 542), or a reception path between the transmitting antenna ANT_TX and a transmitter (power amplifier 546). This antenna path unit 550 may include a switch.

These electronic device components may be operated in the normal power mode or low power mode according to a power mode control signal provided from the control unit 510 illustrated in FIGS. 5A to 5D. In the normal power mode, power is normally supplied to the components. Here, the normal power represents a voltage that is supplied in the active state such as the CELL_DCH state or RRC_CONNECTED state where data transmission/reception is enabled. The control signal is a signal for triggering the low power mode when the control unit 510 detects the data non-transmission period where data transmission/reception does not occur during the predefined time by monitoring the control channel or transmission data. The control signal may be provided to partial components from among the antenna path unit 550, the power amplifier 546, the RF ICs 542 and 544, the ABBs 536 and 538, and the DBBs 532 and 534.

FIG. 10B is a diagram illustrating a power saving operation performed according to an embodiment of the present disclosure.

Referring to FIG. 10B, the control unit 510 (not illustrated) blocks at least one of the paths between the transceiver and the plurality of antennas when the data non-transmission period is detected during a predefined time in the active state where data transmission/reception is enabled. The control unit 510 may block power supplied to components of the transceiver which correspond to the blocked path. The predefined time may be set to be shorter that the time set to change the active state to the idle state. The control unit 510 detects the data non-transmission period where data transmission/reception does not occur during the predefined time by monitoring the control channel or transmission data in the active state. When the control unit 510 detects that there is data to be transmitted/received as a result of monitoring, the control unit 510 further performs an operation of opening the blocked paths between the transceiver and the plurality of antennas.

For example, when it is detected that there is not data to be transmitted to a base station and thus the power mode is changed to the low power mode, a reception path (e.g. path 2) of the antenna path unit 550 through one of the two receiving antennas ANT_RX1 and ANT_RX2 may be blocked in response to the power mode control signal. For another example, in the case where a plurality of transmitting antennas ANT_TX exist, a transmission path of the antenna path unit 550 through one of the plurality of transmitting antennas may be blocked in response to the power mode control signal. That is, when the reception path or transmission path is blocked, power supplied to components of the transceiver corresponding to the blocked path may also be blocked. When reception path 2 of the antenna path unit 550 is blocked, power supplied to corresponding components (e.g. an analog filter, a low noise filter, and a mixer) of the RF IC 542 may also be blocked. The antenna unit 500 may include partial elements (e.g. capacitor) supplied with power, in addition to the plurality of antennas. In this case, an operation of blocking paths between partial antennas and the transceiver and an operation of blocking the power supplied to the partial elements may be further included. Therefore, since the power supplied to components of the transceiver corresponding to the blocked paths of the antenna path unit 550 and/or elements that may be included in the antenna unit 500 is blocked, power consumption may be reduced.

FIG. 10C is a diagram illustrating a power saving operation performed according to an embodiment of the present disclosure.

Referring to FIG. 10C, the control unit 510 (not illustrated) low-power adjusts power supplied to at least one of a plurality of components of the transceiver when the data non-transmission period is detected during a predefined time in the active state where data transmission/reception is enabled. The predefined time may be set to be shorter than the time set to change the active state to the idle state. The control unit 510 detects the data non-transmission period where data transmission/reception does not occur during the predefined time by monitoring the control channel or transmission data in the active state. When the control unit 510 detects that there is data to be transmitted/received as a result of monitoring, the control unit 510 performs an operation of normalizing the low-power adjusted power.

For example, a power supply voltage supplied to partial components from among components of the DBB units 532 and 534, the ABB units 536 and 538, the RF ICs 542 and 544, and the power amplifier 546 may be adjusted to be decreased in response to the power mode control signal in the low power mode. For example, when it is detected that there is not data to be transmitted to a base station and thus the power mode is changed to the low power mode, a level of the power supply voltage supplied to partial components (e.g. power amplifier) from internal components of the DBB unit 532, the ABB unit 536, and the RF IC 542 may be adjusted to be decreased. For another example, in the case of performing a 10-step conversion operation of an ADC included in the ABB unit 536, the power supply voltage may be such supplied that only 5 steps are performed.

As described above, according to various embodiments of the present disclosure, it is detected whether there is data to be transmitted/received when a mobile electronic device such as a smartphone or a cell phone is in an active state where data transmission/reception is enabled. As a result of the detection, the power mode is changed to the low power mode in a data stop period there is not data to be transmitted/received. Power is less consumed in the low power mode than in the active state where high power is consumed, thereby reducing power consumption of the mobile electronic device.

According to the various embodiments of the present disclosure, program commands for performing operations implemented by various computers may be recorded in a computer-readable medium. The computer readable medium may include one or a combination of a program command, a data file, and a data structure. The program command may be specially designed for the present disclosure or may be well known and available in the art. Examples of the computer readable recording medium include hardware devices specially configured to store and perform the program commands, such as hard disks, floppy disks, magnetic media such as magnetic tapes, optical media such as CD-ROMs and DVDs, magneto-optical media such as optical disks, ROMs, RAMs, and flash memories. Examples of the program command include machine language codes made by compilers and high-level language codes that can be executed by computers using interpreters. In the case where a part or the entirety of the mobile electronic devices described in the present disclosure is implemented as a computer program, a computer-readable recording medium in the computer program is stored is also included in the present disclosure.

Therefore, the scope of the present disclosure is defined not by the detailed description of the present disclosure but by the appended claims, and all differences within the scope will be construed as being included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus of a base station for communicating with a terminal in a wireless communication system, the apparatus comprising:
a plurality of antennas;
at least one transceiver; and
at least one processor configured to:
identify, during a radio resource control (RRC) connected state, a data non-transmission period based on whether data to be received is present or not according to a result of decoding a control channel, and
operate at least one antenna for decoding a signal of the terminal in the data non-transmission period while maintaining the RRC connected state, after deactivating at least another antenna of the plurality of antennas based on the data non-transmission period.

2. The apparatus of claim 1, wherein the data non-transmission period is identified based on a physical downlink control channel (PDCCH).

3. The apparatus of claim 1, wherein the at least one antenna is identified to be capable of decoding the signal from the plurality of antennas.

4. The apparatus of claim 1, wherein the at least one processor is further configured to block a radio frequency (RF) path for the at least another antenna.

5. The apparatus of claim 1, wherein the at least one processor is further configured to turn off a power to one or more RF components associated with the at least another antenna.

6. The apparatus of claim 1,
wherein the at least one processor is, to operate the at least one antenna, further configured to switch from a normal operation mode to a power saving mode in response to identifying the data non-transmission period,
wherein the normal operation mode is associated with the plurality of antennas, and
wherein the power saving mode is associated with the at least one antenna.

7. The apparatus of claim 1, wherein the at least one processor is further configured to:
in case that the signal is received from the terminal, activate one or more deactivated antennas of the plurality of antennas.

8. The apparatus of claim 1, wherein a signal quality provided by the at least one antenna is greater than a threshold for decoding the signal.

9. The apparatus of claim 1, wherein the data non-transmission period is shorter than a period of an inactivity timer defined for switching from the RRC connected state to an RRC idle state.

10. The apparatus of claim 1, wherein the signal comprises an uplink signal of the terminal to be decoded by the base station.

11. A method performed by an electronic device in a wireless communication system, the method comprising:
identifying, during a radio resource control (RRC) connected state, a data non-transmission period based on whether data to be received is present or not according to a result of decoding a control channel, and
operating at least one antenna for decoding a signal of a terminal in the data non-transmission period while maintaining the RRC connected state, after deactivating at least another antenna of a plurality of antennas based on the data non-transmission period.

12. The method of claim 11, wherein the data non-transmission period is identified based on a physical downlink control channel (PDCCH).

13. The method of claim 11, wherein the at least one antenna is identified to be capable of decoding the signal from the plurality of antennas.

14. The method of claim 11, further comprising:
blocking a radio frequency (RF) path for the at least another antenna.

15. The method of claim 11, further comprising:
turning off a power to one or more RF components associated with the at least another antenna.

16. The method of claim 11, wherein the operating of the at least one antenna comprises:
switching from a normal operation mode to a power saving mode in response to identifying the data non-transmission period,
wherein the normal operation mode is associated with the plurality of antennas, and
wherein the power saving mode is associated with the at least one antenna.

17. The method of claim 11, further comprising:
in case that the signal is received from the terminal, activating one or more deactivated antennas of the plurality of antennas.

18. The method of claim 11, wherein a signal quality provided by the at least one antenna is greater than a threshold for decoding the signal.

19. The method of claim 11, wherein the data non-transmission period is shorter than a period of an inactivity timer defined for switching from the RRC connected state to an RRC idle state.

20. The method of claim 11, wherein the signal comprises an uplink signal of the terminal to be decoded by a base station.

* * * * *